United States Patent
Mineshima et al.

(10) Patent No.: US 8,562,062 B2
(45) Date of Patent: Oct. 22, 2013

(54) MECHANISM TO SECURE COVER FOR OPENING IN BUMPER

(75) Inventors: Kohei Mineshima, Wako (JP); Masaki Omura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 239 days.

(21) Appl. No.: 12/881,183

(22) Filed: Sep. 14, 2010

(65) Prior Publication Data

US 2011/0088228 A1 Apr. 21, 2011

(30) Foreign Application Priority Data

Oct. 15, 2009 (JP) ................................ 2009-238531

(51) Int. Cl.
 *B62D 25/08* (2006.01)
 *A44B 99/00* (2010.01)
 *B60Q 1/00* (2006.01)
 *F21V 1/00* (2006.01)

(52) U.S. Cl.
 USPC .......... 296/106; 296/115; 296/155; 24/682.1; 362/509

(58) Field of Classification Search
 USPC ......... 293/106, 133, 155, 151, 152, 143, 120; 296/193.09, 187.09; 24/682.1; 362/509
 See application file for complete search history.

(56) References Cited

U.S. PATENT DOCUMENTS

| | | | | |
|---|---|---|---|---|
| 3,926,463 A | * | 12/1975 | Landwehr et al. | 293/136 |
| 6,290,271 B1 | * | 9/2001 | Geisler | 293/115 |
| 6,357,821 B1 | * | 3/2002 | Maj et al. | 296/193.09 |
| 6,659,520 B2 | * | 12/2003 | Bastien et al. | 293/120 |
| 7,090,267 B2 | * | 8/2006 | Pendarvis | 293/155 |
| 7,144,074 B2 | * | 12/2006 | Lee | 296/203.02 |
| 7,733,219 B2 | * | 6/2010 | Kamei et al. | 340/436 |
| 2009/0244918 A1 | * | 10/2009 | Goldsberry | 362/509 |

FOREIGN PATENT DOCUMENTS

| | | |
|---|---|---|
| JP | 2003-246247 | 9/2003 |
| JP | 2004-175190 | 6/2004 |
| JP | 2005-104302 | 4/2005 |
| JP | 2005-271626 | 10/2005 |
| JP | 2006-188082 | 7/2006 |
| JP | 2007186026 A * | 7/2007 |
| WO | WO 2009123942 A1 * | 10/2009 |

OTHER PUBLICATIONS

Japanese Office Action for corresponding JP Application No. 2009-238531, Sep. 6, 2011.

* cited by examiner

*Primary Examiner* — Glenn Dayoan
*Assistant Examiner* — Sunsurraye Westbrook
(74) *Attorney, Agent, or Firm* — Ditthavong Mori & Steiner, P.C.

(57) ABSTRACT

A mechanism to secure a cover for an opening in a bumper includes a securing section at which an opening cover is secured to close the opening. A bumper-side securing portion is provided on one side with respect to a line passing shaft sections and extends from an edge of a bumper opening to a rear with respect to the bumper so as to reside farther from the shaft sections than a locus defined by movement of a one-side end of the opening cover turning about the shaft sections toward an inside with respect to the bumper. A cover-side securing piece is provided on the one-side end of the opening cover to engage with the bumper-side securing portion and has a front-side securing projection that engages with a surface of a secured portion of the bumper-side securing portion on a side of a design surface of the bumper.

19 Claims, 8 Drawing Sheets

MECHANISM TO SECURE COVER FOR OPENING IN BUMPER

CROSS REFERENCES TO RELATED APPLICATIONS

The present application claims priority under 35 U.S.C. §119 to Japanese Patent Application No. 2009-238531 filed Oct. 15, 2009, entitled "Mechanism for Securing Cover for Opening in Bumper." The contents of this application are incorporated herein by reference in their entirety.

BACKGROUND OF THE INVENTION

1. Field of the Invention

The present invention relates to a mechanism to secure a cover for an opening in a bumper.

2. Description of the Related Art

There is a related-art mechanism to secure a cover for an opening in a bumper (see Japanese Unexamined Patent Application Publication No. 2004-175190, for example) in which an opening provided in a bumper for use of a tow hook is provided with a cover and is opened when an end of the cover is pressed and the cover is thus rotated.

Referring to FIGS. 2 and 6 of Japanese Unexamined Patent Application Publication No. 2004-175190, a bumper 1 has an opening 2, a pair of shafts 6 extending inward from side edges, respectively, of the opening 2, and a slit 7 provided at the lower edge of the opening 2. A cover 3 has a pair of support pieces 10 extending to the rear from right and left ends, respectively, thereof, and a locking piece 14 extending to the rear from the lower end thereof. The support pieces 10 are rotatably fitted to the shafts 6, respectively, and the locking piece 14 is inserted into the slit 7, whereby the cover 3 is secured to the bumper 1.

As shown in FIG. 6 of Japanese Unexamined Patent Application Publication No. 2004-175190, in a state where the cover 3 is secured to the bumper 1, the cover 3 has a free end at a position thereof opposite the end having the locking piece 14 with respect to positions where the support pieces 10 are fitted to the shafts 6. Such a free end tends to resonate with, for example, vibrations of the vehicle body.

To suppress such resonance, the stiffness of the cover 3 may be increased, for example.

If, however, the stiffness of the cover 3 is increased, the cover 3 becomes difficult to bend and consequently becomes difficult to remove from the bumper 1.

In addition, with deep grooves 11 provided in the support pieces 10 so that the support pieces 10 can be fitted to the shafts 6, and with an elastic projection 15 and first and second stoppers 16 and 17 provided on the locking piece 14, the cover 3 has a complicated shape, increasing costs of the mechanism.

SUMMARY OF THE INVENTION

According to an aspect of the present invention, a mechanism is to secure a cover for an opening in a bumper in which an opening cover is secured at a bumper opening. The opening cover is provided over the bumper opening so as to cover the bumper opening and is turnable about a pair of shaft sections. The bumper opening is provided in a bumper so as to expose to an outside a tow hook or a tow-hook-attaching portion to which a tow hook is to be attached. The tow hook or the tow-hook-attaching portion is provided on a front of a vehicle body. The mechanism includes a securing section at which the opening cover is secured so as to close the opening.

The securing section includes a bumper-side securing portion and a cover-side securing piece. The bumper-side securing portion is provided on one side with respect to a line passing the shaft sections and extends from an edge of the bumper opening to a rear with respect to the bumper such that the bumper-side securing portion resides farther from the shaft sections than a locus defined by movement of a one-side end of the opening cover turning about the shaft sections toward an inside with respect to the bumper. The bumper-side securing portion has a secured portion. The cover-side securing piece is provided on the one-side end of the opening cover so as to engage with the bumper-side securing portion and has a front-side securing projection that engages with a surface of the secured portion on a side of a design surface of the bumper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will now be described with reference to the accompanying drawings. Herein, the directions of right, left, front, and rear refer to the directions with respect to the driver sitting in the vehicle, which also apply to the drawings.

Embodiment

An embodiment of the present invention will now be described. The arrow (FRONT) shown in the drawings represents the frontward direction of the vehicle.

Figure 1:
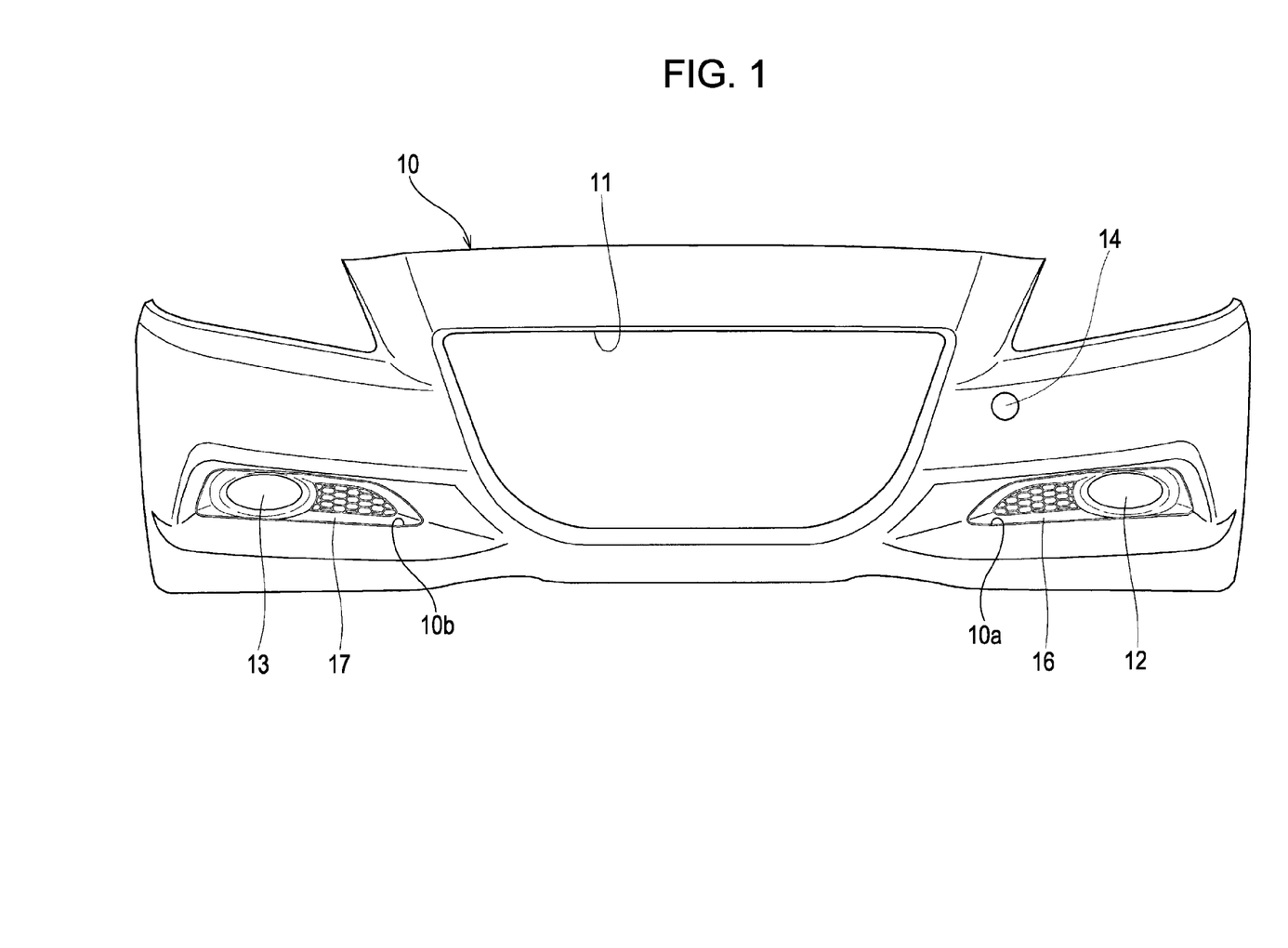
FIG. 1 is a front view of a bumper employing a mechanism for securing an opening cover according to an embodiment of the present invention.

Referring to FIG. 1, a resin bumper face 10 is a bumper skin forming a bumper in combination with an energy absorber, a reinforcement, and so forth, and has a grill opening 11 provided in the center thereof for attachment of a front grill. A pair of fog lamps 12 and 13 are provided at the lower left and right sides, respectively, of the grill opening 11. An opening cover 14 covering a tow-hook opening (not shown in FIG. 1, see FIG. 2) is removably provided on the left side of the grill opening 11.

The fog lamps 12 and 13 are fitted at ends of fog-lamp openings 10a and 10b provided in the bumper face 10, together with fog-lamp covers 16 and 17, respectively.

A tow hook to be inserted into the tow-hook opening 21 has at an end thereof a fastened portion at which the tow hook is to be fastened to the vehicle body with a screw. The tow hook is a part used for connection of tow wire when the vehicle is towed by another vehicle. The opening cover 14 is fitted to an edge 21a (see FIG. 2) of the tow-hook opening 21 unless the tow hook is used.

Figure 2:
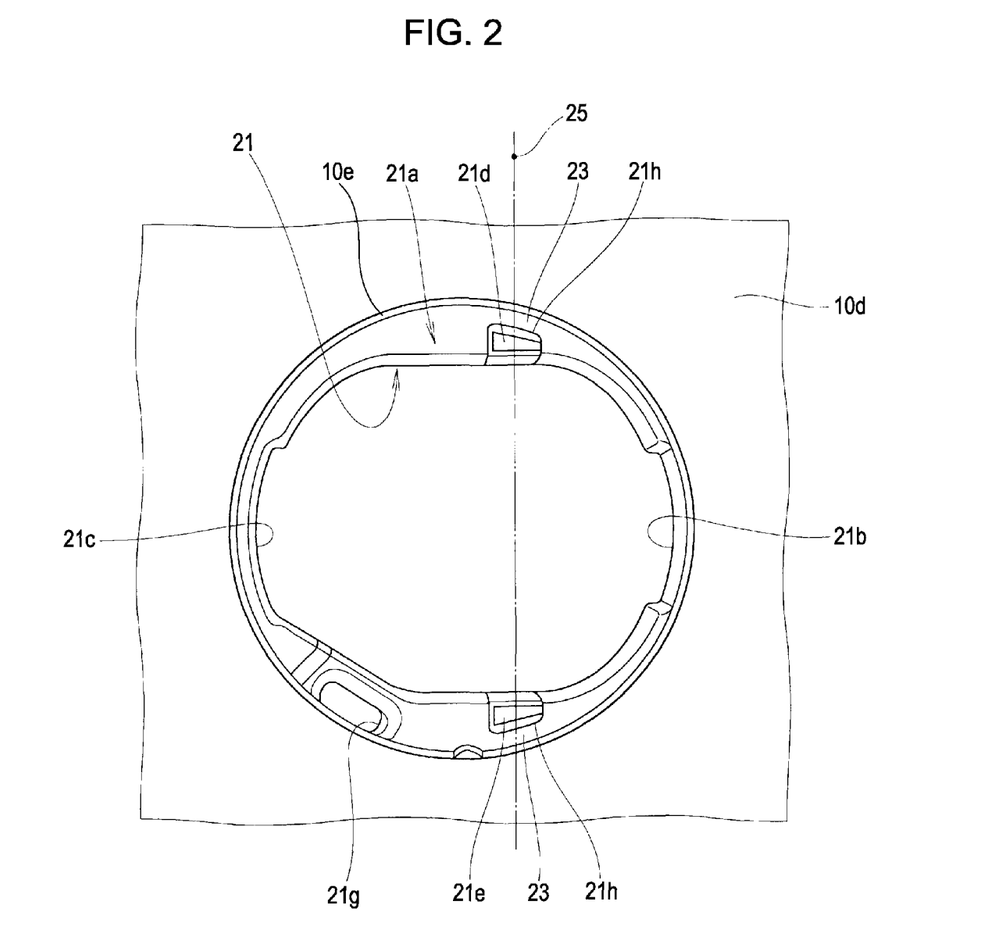
FIG. 2 is a front view of an opening in the bumper according to the embodiment of the present invention.

Referring to FIG. 2, the tow-hook opening 21 is an oblong hole. A pair of concave securing portions 21b and 21c that secure the opening cover 14 (see FIG. 1) are provided on the left and right regions, respectively, of the edge 21a of the tow-hook opening 21. Convex receiving portions 21d and 21e that project to the rear of the vehicle so as to receive the opening cover 14 are provided on the upper and lower regions, respectively, of the edge 21a. An oblong through-hole 21g into which a part of the opening cover 14 is to be inserted is provided on the right side (the left side in FIG. 2) of the convex receiving portion 21e on the lower region of the edge 21a.

The edge 21a is a surface at a level lower than a front surface 10d of the bumper face 10 and has a circular or substantially circular outline. The concave securing portions 21b and 21c, the convex receiving portions 21d and 21e, and the through-hole 21g are provided at the foregoing level.

The convex receiving portions 21d and 21e have outer side faces 21h thereof being spaced apart from a cylindrical boundary wall 10e defining the boundary between the front surface 10d of the bumper face 10 and the edge 21a. Spaces between the boundary wall 10e and the outer side faces 21h provide cover-fitting portions 23 into which parts of the opening cover 14 are to be fitted. A line 25 passes the centers of the pair of convex receiving portions 21d and 21e. The concave securing portion 21b is provided on one side with respect to the line 25, and the concave securing portion 21c is provided on the other side with respect to the line 25.

Figure 3:
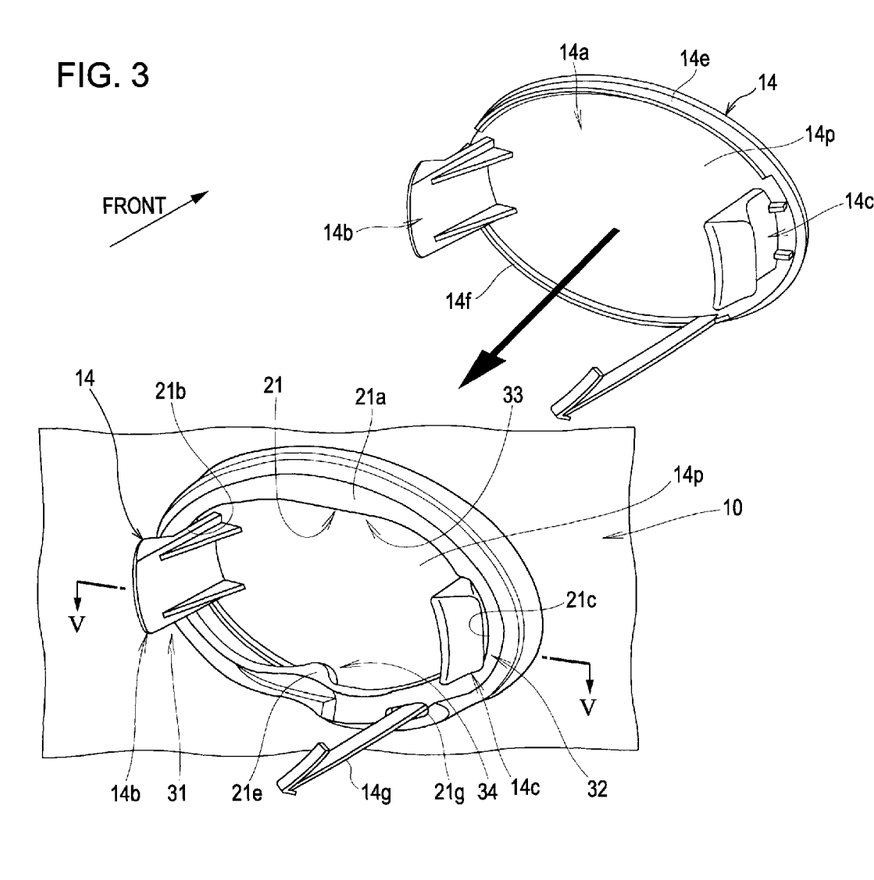
FIG. 3 is a perspective view of the mechanism for securing an opening cover according to the embodiment of the present invention.

FIG. 3 shows the opening cover 14 and the tow-hook opening 21 in the bumper face 10 to which the opening cover 14 is fitted, seen from the rear of the bumper face 10.

The opening cover 14 is a resin part having an integral body that includes a plate-like base 14a having an elliptic or substantially elliptic shape, left and right securing pieces 14b and 14c projecting to the rear from left and right ends, respectively, of a back surface 14p of the plate-like base 14a, circumferential ribs 14e and 14f provided along the circumferential edge of the plate-like base 14a avoiding regions at and near the bases of the left and right securing pieces 14b and 14c, and a hook 14g extending to the rear from a position of the plate-like base 14a adjoining the circumferential rib 14f and configured to be inserted into the through-hole 21g provided at the tow-hook opening 21.

The left and right securing pieces 14b and 14c are fitted into the concave securing portions 21b and 21c, respectively, at the tow-hook opening 21.

The left securing piece 14b and the concave securing portion 21b in combination form a left securing section 31. The right securing piece 14c and the concave securing portion 21c in combination form a right securing section 32.

Figure 4A:
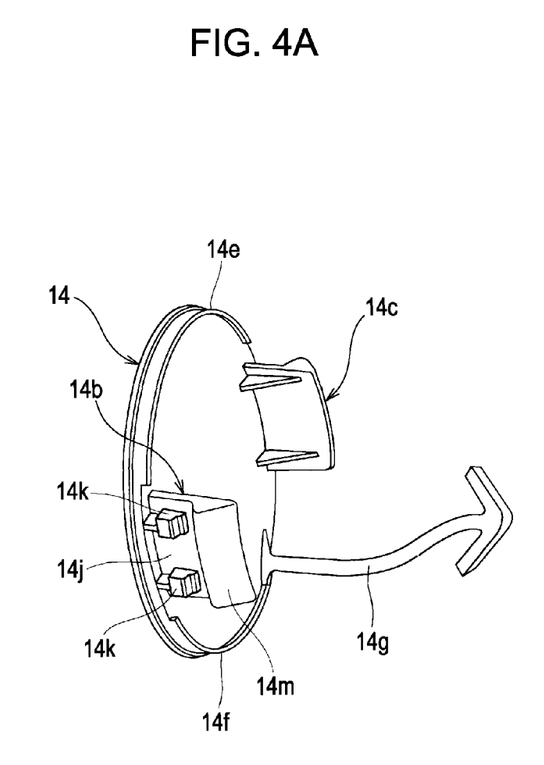
FIG. 4A is a perspective view of the opening cover according to the embodiment of the present invention.

Referring to FIG. 4A, the left securing piece 14b of the opening cover 14 includes a securing-piece base 14j, a pair of front-side securing projections 14k projecting to a side from the securing-piece base 14j, and a rear-side securing projection 14m provided at a position farther from the securing-piece base 14j than the front-side securing projections 14k and at the tip of the left securing piece 14b.

Figure 4B:
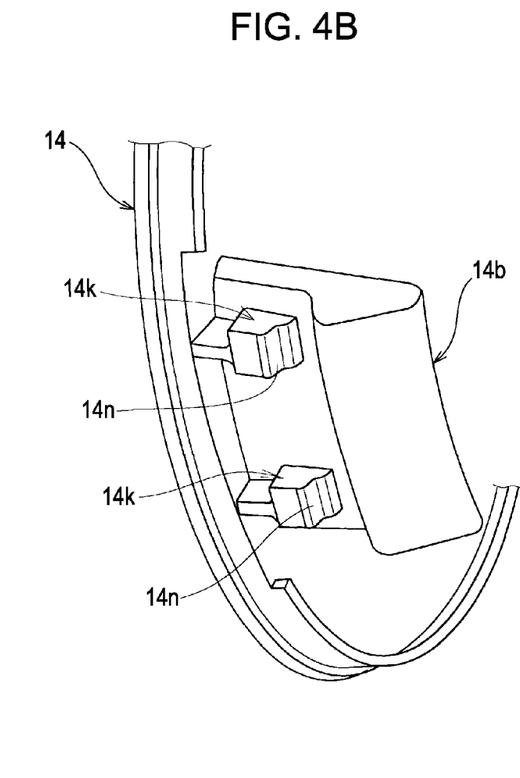
FIG. 4B is another perspective view of the opening cover according to the embodiment of the present invention.

FIG. 4B is an enlarged view of an area including the left securing piece 14b shown in FIG. 4A. The front-side securing projections 14k each have a wavy-shaped end face 14n. The end faces 14n engage with the concave securing portion 21b at the tow-hook opening 21 (see FIG. 3).

Figure 5:
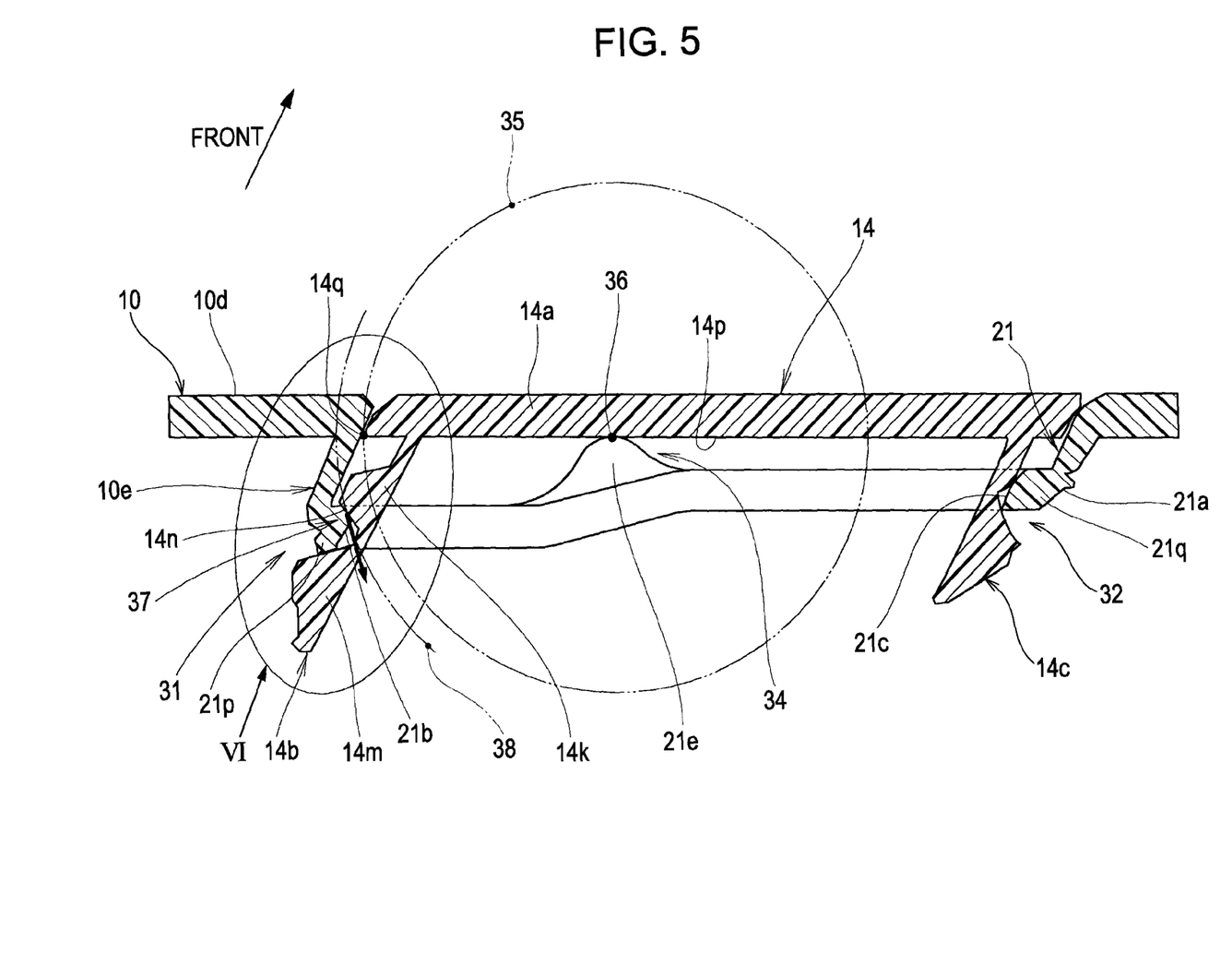
FIG. 5 is a cross-sectional view taken along line V-V in FIG. 3.

Referring to FIG. 5, the cylindrical boundary wall 10e of the bumper face 10 extends to the rear from the front surface 10d of the bumper face 10 and is continued to the edge 21a of the tow-hook opening 21.

The concave securing portions 21b and 21c of the edge 21a include secured portions 21p and 21q, respectively, extending in the anteroposterior direction.

The left securing piece 14b of the opening cover 14 includes the rear-side securing projection 14m and the front-side securing projections 14k. The secured portion 21p of the edge 21a of the tow-hook opening 21 is held between the rear-side securing projection 14m and the front-side securing projections 14k.

The right securing piece 14c of the opening cover 14 secures the secured portion 21q of the edge 21a of the tow-hook opening 21.

The back surface 14p, which is flat, of the plate-like base 14a of the opening cover 14 is in contact with the convex receiving portions 21d and 21e (see FIG. 2) provided on the edge 21a.

The convex receiving portion 21e and the back surface 14p are in a relationship of a shaft and a bearing and in combination form a shaft section 34. Likewise, the convex receiving portion 21d and the back surface 14p are in a relationship of a shaft and a bearing and in combination form another shaft section 33 (see FIG. 3).

Thus, the opening cover 14 is supported by the convex receiving portions 21d and 21e and is secured at the left and right securing sections 31 and 32, thereby being fitted to the bumper face 10.

A circle 35 shown in FIG. 5 represents a locus defined by revolution of an edge 14q (shown by the black dot) of the opening cover 14 around a contact point 36 between the back surface 14p of the plate-like base 14a and each of the convex receiving portions 21d and 21e.

When the edge 14q of the opening cover 14 moves toward the inside with respect to the bumper face 10, i.e., to the rear, the contact point 36 between the back surface 14p of the plate-like base 14a and each of the convex receiving portions 21d and 21e is shifted to the left, and the radius of the locus defined by revolution of the edge 14q therefore becomes shorter. Consequently, the locus defined by revolution of the edge 14q is shifted toward the inside of the circle 35.

The left securing section 31, specifically, a center engaging part 37 at which the concave securing portion 21b and the end faces 14n of the left securing piece 14b engage with each other resides on the outside of the circle 35, i.e., on the outside of the locus defined by revolution of the edge 14q. Accordingly, the concave securing portion 21b resides at a position behind and spaced apart from the front surface 10d of the bumper face 10.

An arc 38, shown in FIG. 5, having the center thereof at the contact point 36 passes the center engaging part 37 and substantially coincides with a locus defined by revolution of the end faces 14n. Hence, the end faces 14n move substantially in the direction of the arrow representing the direction of the tangent to the arc 38.

Figure 6:
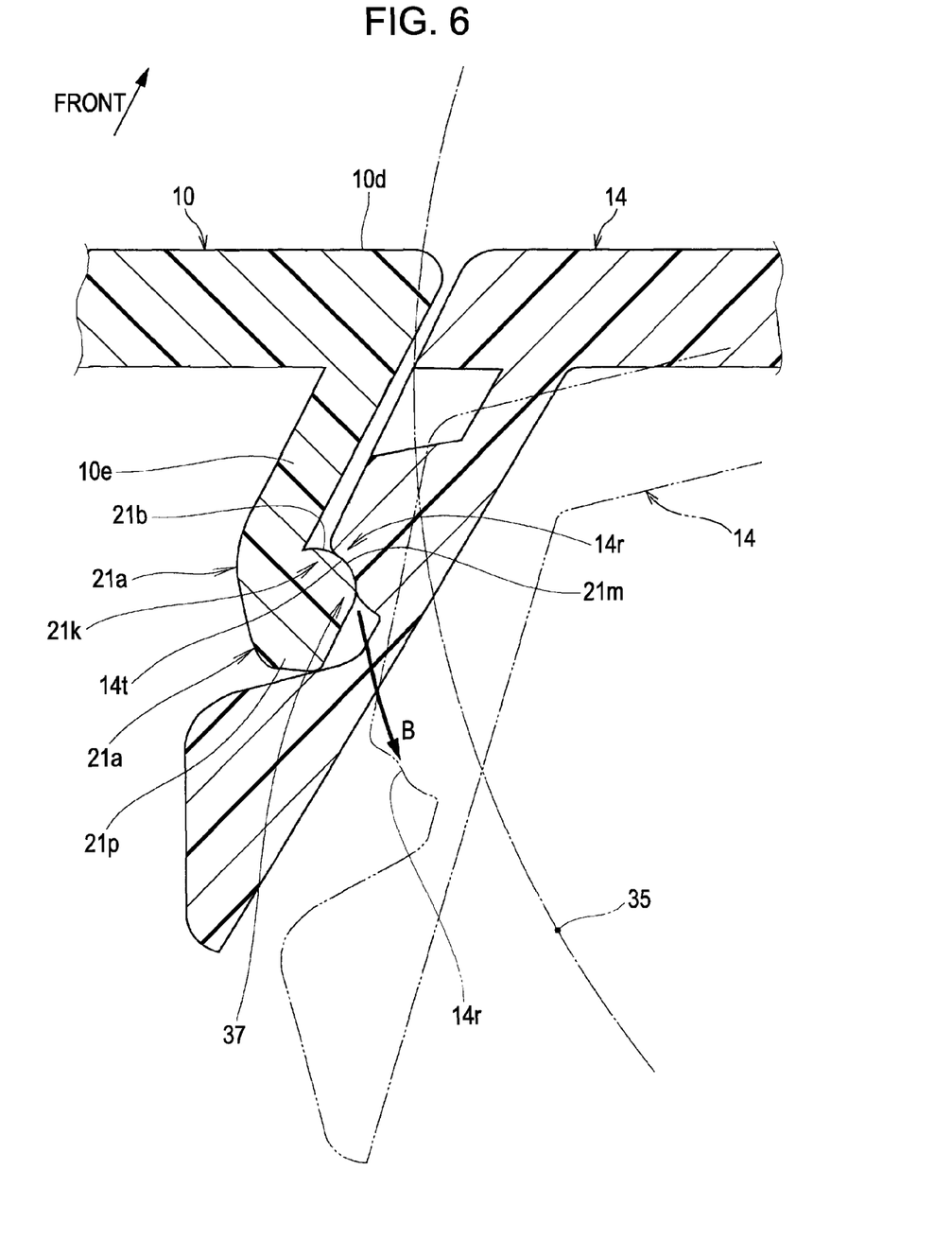
FIG. 6 is an enlarged view of part VI in FIG. 5.

Referring to FIG. 6, the center engaging part 37 includes a convex-sectioned portion 21k that is provided on the concave securing portion 21b of the edge 21a and a concave-sectioned portion 14r that is in contact with the convex-sectioned portion 21k. The convex-sectioned portion 21k has a convex cross section with a convexly curved surface 21m curved in, for example, an arc shape toward the opening cover 14. The concave-sectioned portion 14r has a concave cross section with a concavely curved surface 14t curved in, for example, an arc shape. The concavely curved surface 14t of the concave-sectioned portion 14r is in contact with and fits the convexly curved surface 21m of the convex-sectioned portion 21k.

The convex-sectioned portion 21k and the concave-sectioned portion 14r engage with each other at the curved surfaces 21m and 14t that are curved smoothly. Therefore, the engagement between the convex-sectioned portion 21k and the concave-sectioned portion 14r can be released relatively easily.

The process of removing the opening cover 14 will now be described.

Figure 7:
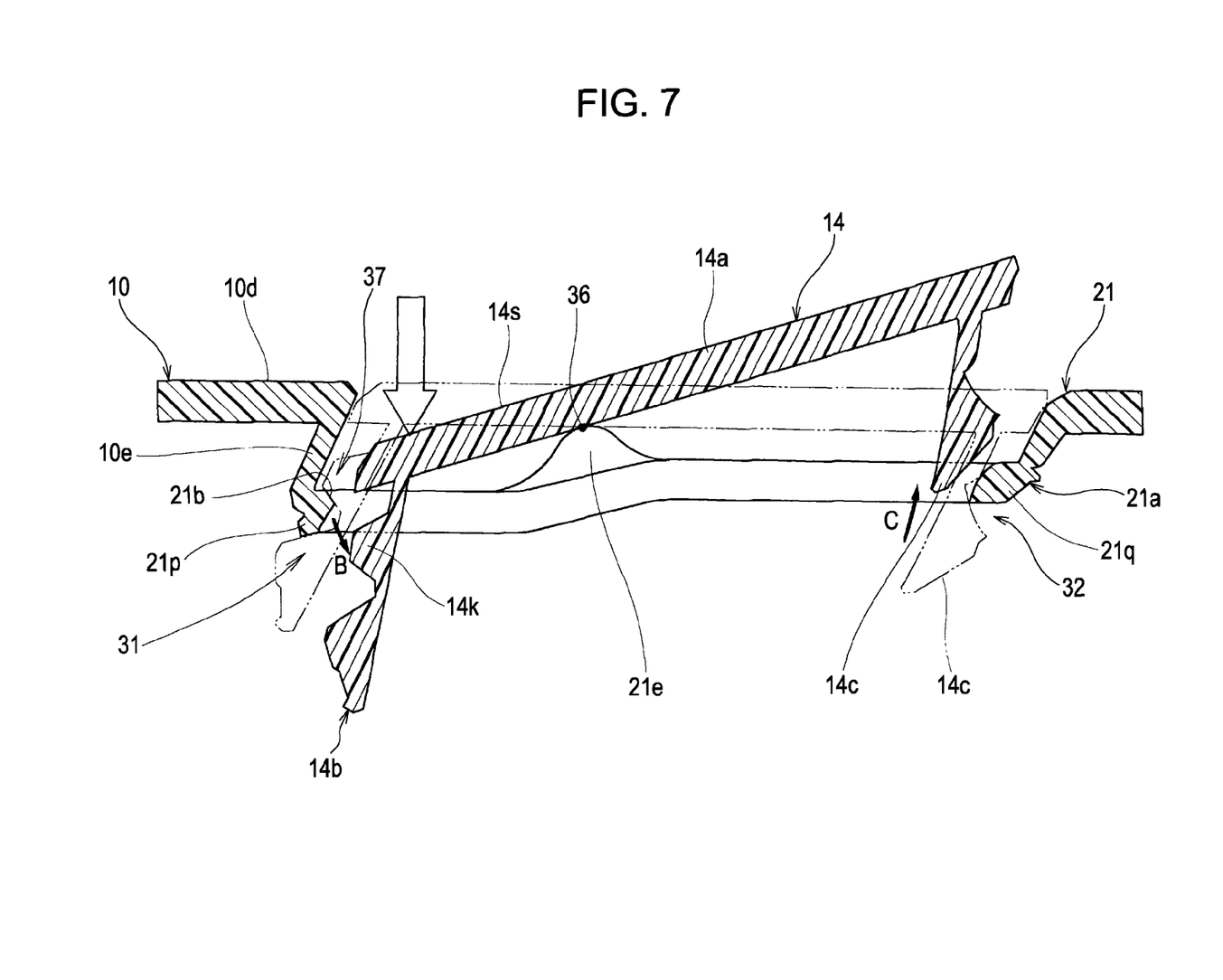
FIG. 7 is a diagram illustrating the behavior of the mechanism for securing an opening cover according to the embodiment of the present invention.

Referring to FIG. 7, when a region 14s of the front surface of the plate-like base 14a on the side near the left securing section 31 with respect to the convex receiving portions 21d and 21e (only the convex receiving portion 21e is shown) is pressed as indicated by the white arrow, the opening cover 14 turns counterclockwise about the convex receiving portions 21d and 21e, specifically, about the contact points 36.

Consequently, the concave-sectioned portion 14r (see FIG. 6) of the opening cover 14 in the left securing section 31 is disengaged from the convex-sectioned portion 21k (see FIG. 6) of the edge 21a of the tow-hook opening 21 and moves as indicated by an arrow B. On the other hand, the right securing piece 14c in the right securing section 32 is disengaged from the secured portion 21q and moves as indicated by an arrow C.

The secured portion 21p of the edge 21a of the tow-hook opening 21 resides at the position behind and spaced apart from the front surface 10d of the bumper face 10. Therefore, the boundary wall 10e is provided with a large height and is therefore easily bendable. Thus, the concave-sectioned portion 14r is easily disengaged from the convex-sectioned portion 21k of the edge 21a of the tow-hook opening 21.

Since the secured portion 21p resides at the position behind and spaced apart from the front surface 10d of the bumper face 10 and the concave-sectioned portion 14r (see FIG. 6) in the center engaging part 37 moves in the direction of the arrow B, shown in FIG. 7, that is angled with respect to the anteroposterior direction, the front-side securing projections 14k of the left securing piece 14b gradually move away from the secured portion 21p. Therefore, the engagement at the center securing part 37 can be released easily. Consequently, the opening cover 14 can be removed relatively easily.

The convex receiving portions 21d and 21e are positioned on the left side with respect to the center of the tow-hook opening 21 in the vehicle-width direction. Therefore, when one end of the opening cover 14 is pressed, the opposite end of the opening cover 14 projects by an amount larger than the amount by which the one end is depressed. Consequently, the opening cover 14 can be removed easily by holding the opposite end of the opening cover 14 that has projected significantly.

Figure 8A:
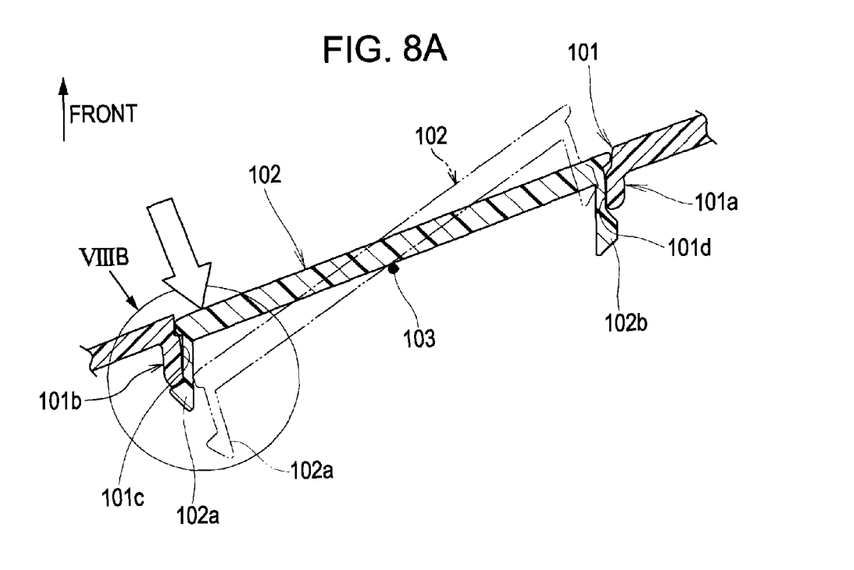
FIG. 8A is a diagram illustrating the behavior of a mechanism for securing an opening cover according to a comparative example.

Referring to FIG. 8A showing a comparative example, an edge 101a of a tow-hook opening 101 includes a cylindrical wall 101b extending to the rear, and a pair of concave securing portions 101c and 101d provided at ends, respectively, of the cylindrical wall 101b. An opening cover 102 covering the tow-hook opening 101 includes a pair of left and right securing pieces 102a and 102b extending to the rear. The left and right securing pieces 102a and 102b are fitted into the concave securing portions 101c and 101d, respectively, of the edge 101a.

When one end of the opening cover 102 is pressed as indicated by the white arrow, the opening cover 102 turns about a center of turning 103 thereof relative to the edge 101a as shown by phantom lines in FIG. 8A, whereby the engagement between the left securing piece 102a and the concave securing portion 101c and the engagement between the right securing piece 102b and the concave securing portion 101d are released. The phantom lines show the state where the opening cover 102 is disengaged from the edge 101a.

Figure 8B:
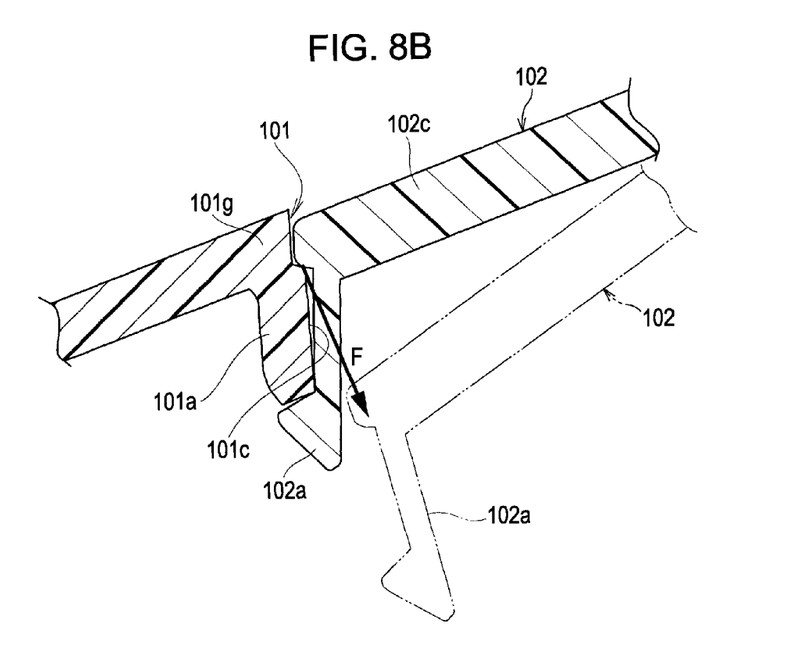
FIG. 8B is another diagram illustrating the behavior of the mechanism for securing an opening cover according to the comparative example.

FIG. 8B is an enlarged view of part VIIIB shown in FIG. 8A. When the one end of the opening cover 102 is pressed, a force represented by an arrow F acts on the tip of the one end of the opening cover 102.

The direction of the force F is substantially orthogonal to a base 102c of the opening cover 102. The tip of the one end of the opening cover 102 engages with a corner 101g of the edge 101a of the tow-hook opening 101. Since the corner 101g has a high stiffness, the corner 101g is difficult to bend. Therefore, the engagement between the left securing piece 102a and the concave securing portion 101c is difficult to release. Consequently, the opening cover 102 cannot be disengaged easily from the edge 101a.

In contrast, in the embodiment of the present invention, as shown in FIGS. 5 and 6, the secured portion 21p of the edge 21a resides at the position behind and spaced apart from the front surface 10d of the bumper face 10. Therefore, the boundary wall 10e is easily bendable. Moreover, since the concave-sectioned portion 14r in the center engaging part 37 moves in the direction of the arrow B that is angled with respect to the anteroposterior direction, the engagement at the center securing part 37 is released more easily than in the comparative example shown in FIGS. 8A and 8B. Accordingly, the opening cover 14 can be removed relatively easily.

As shown in FIGS. 2, 3, and 5, the mechanism to secure a cover for an opening in a bumper is provided in which the opening cover 14 is secured at the tow-hook opening 21. The opening cover 14 is provided over the tow-hook opening 21 so as to cover the tow-hook opening 21 and is turnable about the pair of shaft sections 33 and 34. The tow-hook opening 21, corresponding to a bumper opening, is provided in the bumper face 10 so as to expose to the outside a tow hook or a tow-hook-attaching portion to which a tow hook is to be attached, the tow hook or the tow-hook-attaching portion being provided on the front of a vehicle body. The mechanism includes the left securing section 31, corresponding to a securing section, at which the opening cover 14 is secured so as to be closed. The left securing section 31 includes the concave securing portion 21b, corresponding to a bumper-side securing portion, and the left securing piece 14b, corresponding to a cover-side securing piece. The concave securing portion 21b is provided on one side with respect to the line 25 passing the shaft sections 33 and 34 and extends from the edge 21a of the tow-hook opening 21 to the rear with respect to the bumper face 10 such that the concave securing portion 21b resides farther from the shaft sections 33 and 34 than the locus defined by movement of a one-side end (specifically, the edge 14q) of the opening cover 14 turning about the shaft sections 33 and 34 toward the inside with respect to the bumper face 10. The left securing piece 14b is provided on the one-side end of the opening cover 14 so as to engage with the concave securing portion 21b. The concave securing portion 21b has the secured portion 21p. The left securing piece 14b has the front-side securing projections 14k that engage with the convexly curved surface 21m corresponding to a surface of the secured portion 21p on the side of a design surface (the front surface 10d) of the bumper face 10.

In the above configuration, the left securing section 31 is provided at the end, i.e., the end to be pressed, of the opening cover 14 on the one side with respect to the shaft sections 33 and 34. Therefore, the left securing section 31 suppresses resonance occurring at the one-side end of the opening cover 14 at which the opening cover 14 is to be pressed.

Furthermore, the engaging part at which the secured portion 21p of the concave securing portion 21b and the front-side securing projections 14k engage with each other is provided at a position behind the front surface 10d of the bumper face 10. Consequently, the opening cover 14 can be removed relatively easily.

As shown in FIGS. 2 and 3, the shaft sections 33 and 34 include the convex receiving portions 21d and 21e, respectively, and the back surface 14p of the opening cover 14. The convex receiving portions 21d and 21e, corresponding to projections, are provided on the edge 21a of the tow-hook opening 21 and form shafts. The back surface 14p, corresponding to a flat surface, is provided on the opening cover 14 so as to bear the convex receiving portions 21d and 21e. The cover-fitting portions 23, corresponding to circumferential grooves, into which the circumferential ribs 14e and 14f, corresponding to ribs, provided on the circumference of the opening cover 14 are fitted are provided on the sides, respectively, of extensions of the line (the line 25) connecting the pair of convex receiving portions 21d and 21e. Therefore, the structures of the shaft sections 33 and 34 are simplified, whereby increases in costs are suppressed.

Furthermore, with the cover-fitting portions 23, the circumferential ribs 14e and 14f are easily provided on the opening cover 14; the heights of the circumferential ribs 14e and 14f are increased; and the stiffness of the opening cover 14 is increased. Consequently, resonance occurring on the opening cover 14 is further suppressed.

As shown in FIG. 5, the left securing piece 14b has the rear-side securing projection 14m on the rear side thereof with respect to the front-side securing projections 14k, and the secured portion 21p is held between the rear-side securing projection 14m and the front-side securing projections 14k. Therefore, the securing force of the left securing section 31 is increased. Consequently, resonance occurring on the opening cover 14 is further suppressed.

As shown in FIGS. 2 and 5, the right securing section 32, corresponding to a second securing section, that secures the opening cover 14 at the tow-hook opening 21 is provided on the other side with respect to the line 25 passing the shaft sections 33 and 34, and the right securing section 32 prevents the other-side end of the opening cover 14 from moving frontward. Therefore, the opening cover 14 is more firmly secured to the edge 21a of the tow-hook opening 21 with the left and right securing sections 31 and 32. Consequently, resonance occurring on the opening cover 14 is further suppressed.

The mechanism to secure a cover for an opening in a bumper according to the embodiment of the present invention is suitable for automobiles.

Since the securing section is provided at the end, i.e., the end to be pressed, of the opening cover on the one side with respect to the shaft sections, the securing section suppresses resonance occurring at the one-side end of the opening cover at which the opening cover is to be pressed.

Furthermore, the bumper-side securing portion that extends from the edge of the bumper opening to the rear with respect to the bumper is provided such that the bumper-side securing portion resides farther from the shaft sections than the locus defined by movement of the one-side end of the opening cover. Thus, the bumper-side securing portion, specifically, an engaging part at which the front-side securing projection of the cover-side securing piece and the secured portion of the bumper-side securing portion engage with each other, is provided at a position behind the front surface, i.e., the design surface, of the bumper.

Accordingly, the total length of the bumper-side securing portion is increased, making the bumper-side securing portion easily bendable. Furthermore, a force applied to the foregoing engaging part acts in such a direction that the engagement at the engaging part is released easily. Consequently, the opening cover can be removed relatively easily.

In the embodiment of the present invention, it is preferable that the shaft sections each include a projection provided on the edge of the bumper opening and forming a shaft, and a flat surface provided on the opening cover so as to bear the projection. It is also preferable that circumferential grooves into which ribs provided on a circumference of the opening cover are fitted be provided on sides, respectively, of extensions of a line connecting the projections.

Thus, the shaft sections each have a simple configuration including the projection and the flat surface bearing the projection. Consequently, increases in costs are suppressed.

Furthermore, with the circumferential grooves, the ribs are easily provided on the opening cover; the heights of the ribs are increased; and the stiffness of the opening cover is increased. Consequently, resonance occurring on the opening cover is further suppressed.

In the embodiment of the present invention, it is also preferable that the cover-side securing piece have a rear-side securing projection on a rear side thereof with respect to the front-side securing projection, and that the secured portion be held between the rear-side securing projection and the front-side securing projection.

Since the secured portion is held between the rear-side securing projection and the front-side securing projection, the secured portion is firmly secured with an increased securing force of the securing section. Consequently, resonance occurring on the opening cover is further suppressed.

In the embodiment of the present invention, it is also preferable that the mechanism further include a second securing section that secures the opening cover at the bumper opening 21, the second securing section being provided on another side with respect to the line passing the shaft sections, the second securing section preventing an another-side end of the opening cover from moving frontward.

With the securing section and the second securing section, the opening cover is more firmly secured to the edge of the bumper opening. Consequently, resonance occurring on the opening cover is further suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A mechanism to secure a cover for an opening in a bumper in which an opening cover is secured at a bumper opening, the opening cover being provided over the bumper opening so as to cover the bumper opening, the bumper opening being provided in a bumper so as to expose to an outside a tow hook or a tow-hook-attaching portion to which a tow hook is to be attached, the tow hook or the tow-hook-attaching portion being provided on a vehicle body, the mechanism comprising:

a pair of shaft sections configured to pivotally support the opening cover and provided movable toward a one-side end of the opening cover when the one-side end of the opening cover turns about the shaft sections toward an inside with respect to the bumper; and a securing section at which the opening cover is secured so as to close the opening, the securing section comprising:

a bumper-side securing portion that is provided on one side with respect to a line passing the shaft sections and extends from an edge of the bumper opening to an inside with respect to the bumper such that the bumper-side securing portion resides farther from the shaft sections than a locus defined by movement of the one-side end of the opening cover turning about the shaft sections toward an inside with respect to the bumper, the bumper-side securing portion having a secured portion; and a cover-side securing piece that is provided on the one-side end of the opening cover so as to engage with the bumper-side securing portion and that has an outside securing projection and an inside securing projection, the outside securing projection engaging with a surface of the secured portion on a side of a design surface of the bumper when the opening cover covers the bumper opening, the inside securing projection being provided on an opposite side of the outside securing projection with respect to the secured portion when the opening cover covers the bumper opening, the secured portion being held between the inside securing projection and the outside securing projection when the opening cover covers the bumper opening, wherein an engaging part at which the secured portion and the outside securing projection engage with each other resides on an outside of the locus defined by the movement of the one-side end of the opening cover.

2. The mechanism according to claim 1,
wherein the shaft sections each comprises
a projection provided on the edge of the bumper opening and forming a shaft, and
a flat surface provided on the opening cover so as to bear the projection, and
wherein the bumper opening has circumferential grooves into which ribs provided on a circumference of the opening cover are fitted, the circumferential grooves being provided on sides, respectively, of extensions of a line connecting the projection of one of the shaft sections to the projection of another one of the shaft sections.

3. The mechanism according to claim 2,
wherein the cover-side securing piece has an inside securing projection on an inside of the cover-side securing piece with respect to the outside securing projection, and
wherein the secured portion is held between the inside securing projection and the outside securing projection.

4. The mechanism according to claim 2, further comprising a second securing section that secures the opening cover at the bumper opening, the second securing section being provided on another side with respect to the line passing the shaft sections, the second securing section preventing an another-side end of the opening cover from moving outward.

5. The mechanism according to claim 1, further comprising a second securing section that secures the opening cover at the bumper opening, the second securing section being provided on another side with respect to the line passing the shaft sections, the second securing section preventing an another-side end of the opening cover from moving outward.

6. The mechanism according to claim 1, wherein the opening cover covers the bumper opening.

7. The mechanism according to claim 1, wherein the cover-side securing piece is a projecting member that projects towards the inside, and wherein both the outside securing projection and the inside securing projection are provided on the projecting member.

8. The mechanism according to claim 7, wherein the secured portion directly contacts the inside securing projection and the outside securing projection when the opening cover covers the bumper opening.

9. The mechanism according to claim 1, wherein the secured portion directly contacts the inside securing projection and the outside securing projection when the opening cover covers the bumper opening.

10. A securing mechanism comprising:
a bumper for a vehicle, the bumper having a bumper opening;
an opening cover configured to be secured within the bumper opening,
wherein the bumper opening includes a first convex receiving portion projecting from a peripheral portion of the bumper opening and a second convex receiving portion projecting from the peripheral portion of the bumper opening, said first and second convex receiving portions being configured to contact and pivotally receive the opening cover about a pivot line,
wherein the opening cover includes a base member that is configured to cover the bumper opening when the opening cover is secured to the bumper opening, the base member being configured to abut against the bumper opening at a first point on a first side of the opening cover,
wherein the opening cover includes a first cover-side securing piece that extends from the base member inward from an exterior surface of the base member,
wherein the bumper opening includes a first bumper-side securing portion that extends inward from an exterior surface of the bumper, the first bumper-side securing portion being configured to secure to the first cover-side securing piece at a second point on the first side of the opening cover, and
wherein a shortest distance between the pivot line and the first point is less than a shortest distance between the pivot line and the second point.

11. The securing mechanism according to claim 10,
wherein the first convex receiving portion is provided on a substantially opposite side of the second convex receiving portion with respect to the bumper opening.

12. The securing mechanism according to claim 10,
wherein the opening cover includes a second cover-side securing piece that extends from the base member inward from an exterior surface of the base member,
wherein the bumper opening includes a second bumper-side securing portion that extends inward from an exterior surface of the bumper, the second bumper-side securing portion being configured to be secured to the second cover-side securing piece.

13. The securing mechanism according to claim 12,
wherein the first and second convex receiving portions are provided between the first and second bumper-side securing portion.

14. The securing mechanism according to claim 13,
wherein the first and second convex receiving portions are provided closer to the first bumper-side securing portion than the second bumper-side securing portion.

15. The securing mechanism according to claim 14,
wherein the first bumper-side securing piece includes a securing projection,
wherein the first cover-side securing piece includes a first projection and a second projection, the first projection being configured to engage with the securing projection at the second point and being provided between the base member and the second projection, the second projection being configured to engage with the securing projection, and
wherein the securing projection is provided between the first and second projections when the opening cover is secured within the bumper opening.

16. The securing mechanism according to claim 15,
wherein the securing projection includes a convexly curved surface, and
wherein the first projection includes a concavely curved surface configured to contact the convexly curved surface.

17. The securing mechanism according to claim 10, wherein
the first and second convex receiving portions project from a peripheral portion of the bumper opening toward an outside of the bumper.

18. The securing mechanism according to claim 10, wherein said first and second convex receiving portions are configured to directly contact an inside surface of the base member of the opening cover when the opening cover is secured to the bumper opening.

19. The securing mechanism according to claim 10, wherein the pivot line extends through both a first contact point located at the contact between the first convex receiving portion and the opening cover and a second contact point located at the contact between the second convex receiving portion and the opening cover.

* * * * *